United States Patent
Dietz et al.

(10) Patent No.: US 6,189,834 B1
(45) Date of Patent: *Feb. 20, 2001

(54) COLLAPSIBLE CARGO MANAGEMENT SYSTEM FOR TRANSPORTING PAYLOADS SUSPENDED FROM AIRCRAFT

(75) Inventors: Phillip Dietz, Sandy; James T. Haroldsen, Herriman; Donald P. Cox, Mapleton, all of UT (US)

(73) Assignee: Skyhook Technologies, Inc., Draper, UT (US)

(*) Notice: Under 35 U.S.C. 154(b), the term of this patent shall be extended for 0 days.

This patent is subject to a terminal disclaimer.

(21) Appl. No.: 09/174,033

(22) Filed: Oct. 16, 1998

Related U.S. Application Data

(63) Continuation-in-part of application No. 08/689,302, filed on Aug. 7, 1996, now Pat. No. 5,836,548, which is a continuation-in-part of application No. 08/384,414, filed on Feb. 6, 1995, now Pat. No. 5,593,113.

(51) Int. Cl.[7] .................................................. B64D 1/08
(52) U.S. Cl. ................................. 244/137.1; 244/137.4; 244/118.1
(58) Field of Search ............................ 244/137.1, 137.4, 244/118.1; 177/245, 244; 248/163, 439, 434; 294/82.15, 82.26, 82.24, 87.1, 86.4, 81.56; 73/862.625; 310/232, 90; 403/165, 164

(56) References Cited

U.S. PATENT DOCUMENTS

| | | | |
|---|---|---|---|
| 932,683 | * | 8/1909 | Darrow . |
| 1,440,471 | * | 1/1923 | Kohler . |
| 2,379,383 | | 6/1945 | Steel ........................................ 89/1.5 |
| 2,522,096 | * | 9/1950 | Cooke . |
| 2,651,533 | | 9/1953 | Miller .................................... 287/91 |
| 2,820,397 | | 1/1958 | Durkin ................................... 89/1.5 |
| 3,003,198 | * | 10/1961 | Kronhaus et al. . |
| 3,036,797 | * | 5/1962 | Agusta . |
| 3,044,818 | | 7/1962 | Tobey ..................................... 294/81 |
| 3,601,342 | | 8/1971 | Piasecki ............................... 244/137 |
| 3,602,544 | | 8/1971 | Marsh .................................... 294/74 |
| 3,656,796 | | 4/1972 | Cook .................................. 294/78 R |
| 3,690,602 | | 9/1972 | Marsh .............................. 244/137 R |
| 3,838,836 | | 10/1974 | Asseo et al. ..................... 244/137 R |
| 3,946,971 | | 3/1976 | Chadwick ........................ 244/137 R |
| 4,256,012 | | 3/1981 | Cowart et al. ...................... 89/1.816 |
| 4,378,919 | | 4/1983 | Smith ................................ 244/118.1 |
| 4,553,719 | | 11/1985 | Ott .................................... 244/118.1 |
| 4,575,028 | | 3/1986 | Dean et al. ....................... 244/137 A |

(List continued on next page.)

Primary Examiner—Peter M. Poon
Assistant Examiner—Tien Dinh
(74) Attorney, Agent, or Firm—Kirton & McConkie; Michael F. Krieger

(57) ABSTRACT

An airframe apparatus for attaching and selectively releasing multiple payloads suspended from an aircraft. The airframe apparatus includes a collapsible loading frame that is configured to have a stabilized open position and a collapsed closed position. The loading frame is constructed from a plurality of vertical struts and horizontal struts that are hingedly interconnected at corner assemblies to allow the loading frame to be collapsed. A payload hook is connected to each of the corner assemblies by a universal joint. A plurality of legs are rotatably attached to the loading frame and can be extended below the loading frame to support the payload hooks off the ground during landing of the airframe apparatus. Shock absorbing devices are operatively attached to the legs to absorb the impact of the loading frame against the ground during landing. The airframe apparatus is used as part of a cargo management system for transporting multiple payloads suspended from an aircraft. The cargo management system includes the airframe apparatus, an attached cable assembly which is used to suspend the airframe apparatus beneath an aircraft such as a helicopter, and electronic controls.

27 Claims, 12 Drawing Sheets

U.S. PATENT DOCUMENTS

| | | | |
|---|---|---|---|
| 4,589,615 | 5/1986 | Walker, Jr. | 244/137 R |
| 4,609,168 | 9/1986 | Dean et al. | 244/137 A |
| 4,776,545 * | 10/1988 | Miyamoto . | |
| 4,826,109 | 5/1989 | Camus | 244/137.4 |
| 4,881,601 | 11/1989 | Smith | 169/53 |
| 5,238,208 | 8/1993 | Davis | 244/118.1 |
| 5,352,056 | 10/1994 | Chandler | 403/79 |
| 5,499,785 | 3/1996 | Roberts et al. | 244/137.4 |
| 5,509,361 * | 4/1996 | Chen . | |
| 5,836,548 | 11/1998 | Dietz et al. | 244/137.1 |

* cited by examiner

COLLAPSIBLE CARGO MANAGEMENT SYSTEM FOR TRANSPORTING PAYLOADS SUSPENDED FROM AIRCRAFT

RELATED APPLICATIONS

This application is a continuation-in-part of U.S. patent application Ser. No. 08/689,302, filed Aug. 7, 1996 now U.S. Pat. No. 5,836,548, which is a continuation-in-part of U.S. patent application Ser. No. 08/384,414, filed Feb. 6, 1995, U.S. Pat. No. 5,593,113. For purposes of disclosure, the above-identified patent applications are incorporated herein by reference.

BACKGROUND OF THE INVENTION

1. Field of the Invention

The present invention relates generally to systems for transporting payloads on aircraft. More specifically, the invention relates to a system for attaching and selectively releasing multiple cargo payloads which are transported by being suspended beneath an aircraft such as a helicopter.

2. Relevant Technology

Aircraft such as helicopters have long been used to deliver payloads of different size and shape. Traditionally, a cable is suspended from a helicopter with a hook attached to one end of the cable. By attaching the hook to a payload, the helicopter is able to transport the payload to a desired location. Suspending the payload beneath a helicopter permits the helicopter to transport oversized cargo, such as a jeep or other large hardware.

Furthermore, the helicopter is able to deliver the payload to unique and specific locations, such as on top of a building or in rugged terrain, where an airplane could not land. In addition, the use of a suspended cable permits the helicopter to deliver or recive cargo without actually having to land. By lowering the cable, a receiving party can remove or attach a payload to the hook. This is most beneficial with regard to emergency rescues and in delivering payloads in congested areas.

Although there are numerous benefits in using a conventional hook and cable assembly to deliver a payload suspended beneath a helicopter, several shortcomings are also found. For example, using a single cable and hook assembly typically permits the transport of only a single payload per flight. Such an assembly necessitates numerous flights, costing both time and money, to deliver multiple payloads which cannot simultaneously be attached to a single hook.

Furthermore, to remove a payload from a conventional hook and cable assembly, either the helicopter must land or the payload must be lowered to the ground and manually removed from the hook. Such procedures require both a certain amount of time and the necessity of a receiving party at the unloading location to remove the payload. The necessity of a receiving party to remove the payload is detrimental in an emergency situation where it is preferable to jettison the payload during flight or where it is desirable to release a payload at a location where there is no receiving party.

In an attempt to alleviate these problems, carrousel hook systems have been made. The carrousel hook systems comprise a frame having a plurality of hooks attached thereto. The frame is suspended from a helicopter by a support cable. Likewise, an electrical cable extends from the helicopter to each of the hooks. By triggering a switch within the helicopter, the hooks can be consecutively opened, thereby releasing the attached loads.

Several problems or shortcomings, however, have also been encountered with carrousel hook systems. Forces such as the wind and movement of the aircraft can result in rotation of the carrousel frame which in turn applies a torsional force on the support cables and the helicopter. Such a force can damage the cables and the connection to the helicopter. Likewise, the torsional force can affect the navigation ability of the helicopter.

Conventional carrousel systems are also designed to carry multiple payloads so that the frame is evenly balanced. When only a single load is being carried, the unbalanced force of the payload can produce detrimental stresses on the frame.

Carrousel systems also have the drawback in that the hooks can only be activated consecutively and not selectively. That is, carrousel hooks can only be opened in sequential order. At times, it is desirable to be able to selectively open any desired hook.

Finally, an additional problem with some carrousel systems is that they are difficult to transport other than below a helicopter. That is, carrousel systems are often too big to fit within a helicopter or in the bed of a pickup truck. Since helicopters travel slower when the carrousel system is suspended below, it is desirable to be able to store the system within the helicopter when it is not required.

Accordingly, there is a need for an improved system for transporting cargo suspended from an aircraft that overcomes or avoids the above problems.

OBJECTS AND BRIEF SUMMARY OF THE INVENTION

Accordingly, it is an object of the present invention to provide a system for carrying and selectively releasing multiple payloads suspended from an aircraft.

A further object of the invention is to provide an apparatus for carrying payloads that can rotate freely along with the payloads relative to a connecting cable when suspended from an aircraft, thereby preventing a torsional force from being applied to the cable, aircraft, and apparatus.

Another object of the present invention is to provide an apparatus as above wherein the frame of the system is configured to carry one or several payloads while minimizing stresses and particularly moment arm forces on the frame.

Finally, another object of the present invention is to provide apparatus as above which are large enough to carry multiple payloads but which can be easily collapsed so as to fit within a helicopter or in the back of pickup truck.

To achieve the forgoing objectives and in accordance with the invention as disclosed herein, a cargo management system is provided. The cargo management system includes an elongated support cable configured for suspension from a helicopter and an airframe removably attached to the end of the support cable. The airframe includes a collapsible loading frame that is coupled with the support cable through a hub assembly. The loading frame is configured having a stabilized open position and a collapsed closed position. The loading frame is constructed from a plurality of horizontal struts interconnected at corner assemblies in a horizontal plane. A plurality of vertical struts project from each corner assembly to the hub assembly.

In the open position, the loading frame has a substantially tetrahedral shape. The loading frame has various hinged portions to allow the loading frame to fold into the closed position. For example, the lower struts are each formed with a hinged middle portion. Furthermore, each end of the horizontal and vertical struts is hingedly attached to a corner assembly or the hub assembly.

The hub assembly includes a spindle assembly coupled with an attachment assembly by a universal joint. The attachment assembly comprises brackets that are coupled with the upper end of the vertical struts. The spindle assembly is configured to facilitate annular rotation of the loading frame and the universal joint relative to the to the support cable. The spindle is attached to the support cable by a shackle having a load cell coupled therewith.

The universal joint permits pivoting movement of the load frame relative to the spindle assembly. The universal joint pivots around a central point. Each of the vertical struts has a longitudinal axis that intersects with the central point. As such, moment arm stresses are reduced on the load frame.

In one embodiment, a center strut vertically extends down from the attachment assembly. Connected to the end of the center strut is an electrically operated payload hook. A plurality of hinged tension members extend from the center strut to each of the corner assemblies.

Also attached to each corner assembly is an electrically controlled payload hook that is capable of attaching and selectively releasing a payload. Each payload hook is attached to the corner assembly by a universal joint which enables the payload hook to maintain a substantially vertical orientation as the loading frame is tilted. Each universal joint bends at a load point. The longitudinal axis of each vertical strut and each horizontal strut intersects with the load point, thereby further minimizing any moment arm forces on the load frame.

A plurality of support legs are rotatably attached to the loading frame. The support legs can be selectively moved and locked into a variety of different positions depending on the intended use of the airframe.

The present invention has been developed in response to the present state of the art and, in particular, in response to problems and needs that have not been fully or completely solved by currently available technology. The present invention, as described below in greater detail, achieves each of the desired objectives. For example, the multiple payload hooks permit carrying of multiple payloads. The spindle assembly allows the load frame to freely rotate, thereby minimizing torsional forces on the support cable and airframe. As a result of the loading frame being collapsible, the airframe can be easily carried within a helicopter or in the back of a pickup truck. Finally, by configuring the airframe such that the central longitudinal axis of the vertical struts and the horizontal struts are aligned with the different universal joints, moment arm forces on the airframe are minimized when payloads are attached thereto.

These and other objects, features, and advantages of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF A PREFERRED EMBODIMENT

The present invention is directed to an airframe apparatus that is used as part of a cargo management system for attaching and selectively releasing multiple payloads suspended from an aircraft during cargo transport. The airframe apparatus includes a collapsible loading frame that is configured to have a stabilized open position and a collapsed closed position.

Figure 1:
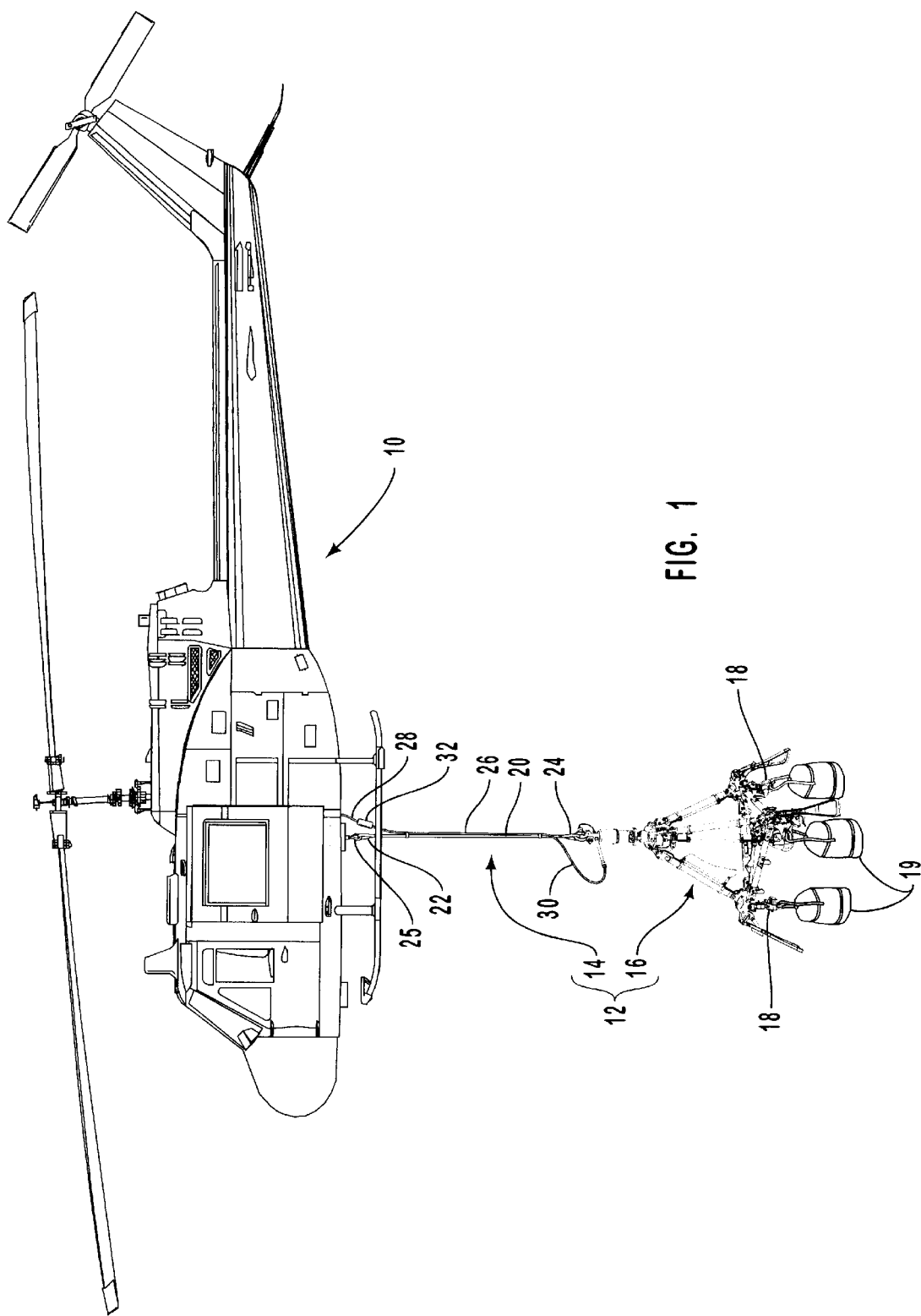
FIG. 1 is perspective view of a cargo management system including a cable assembly and an airframe suspended from a helicopter.

Referring to the drawings, where like parts are designated with like reference numerals throughout, FIGS. 1–12 illustrate one embodiment of a cargo management system 12 incorporating features of the present invention. Specifically, depicted in FIG. 1 is a helicopter 10 having cargo management system 12 suspended therefrom. Cargo management system 12 includes a cable assembly 14 having an airframe 16 attached to the end thereof. Airframe 16 includes a plurality of payload hooks 18 used for attaching and selectively releasing a plurality of payloads 19 thereto. Although cargo management system 12 is shown suspended from helicopter 10, the present invention can be used in combination with other aircraft that are capable of vertical take-off and landing.

Cable assembly 14 includes an elongated support cable 20 having a first loop 22 formed at one end and a second loop 24 formed at the opposing end. First loop 22 is removably attached to an electronically operated cargo hook 25 secured to the bottom of helicopter 10. Second loop 24 is secured to airframe 16. In one embodiment, support cable 22 is formed from SPECTRA™. Such cables can be purchased from Cortland Cables out of Cortland, N.Y. Alternatively, support cable 22 can be made from other types of materials such as multi-strand, stainless steel cable, carbon fibers, KEVLAR™, nylon, composites, or other synthetics depending on the intended use.

The length of support cable 22 is dependent on the intended use of the system. Typically, support cable 22 must be of sufficient length so that helicopter 10 can lower airframe 16 to the ground for releasing or attaching payloads 19 thereto without endangering helicopter 10 by surrounding objects such as trees or buildings. Alternatively, support cable 22 should not be so long as to be unmanageable or result in the attached payloads 19 striking grounded objects during normal flight of helicopter 10. Accordingly, support cable 22 preferably has a length in a range from about 3 meters to about 40 meters.

FIG. 1 also shows an electrical control cable 26 having a first end 28 attached to helicopter 10 and a second end 30 attached to airframe 16. As discussed below in greater detail, control cable 26 is used for transferring power and signals back and forth between helicopter 10 and airframe 16. To enable a quick release of cargo management system 12 from helicopter 10, an emergency disconnect 32 is positioned at first end 28. Disconnect 32 can either be manually pulled apart or functions to automatically pull apart under the weight of airframe 16 when cargo management system 12 is released from helicopter 10.

Figure 2:
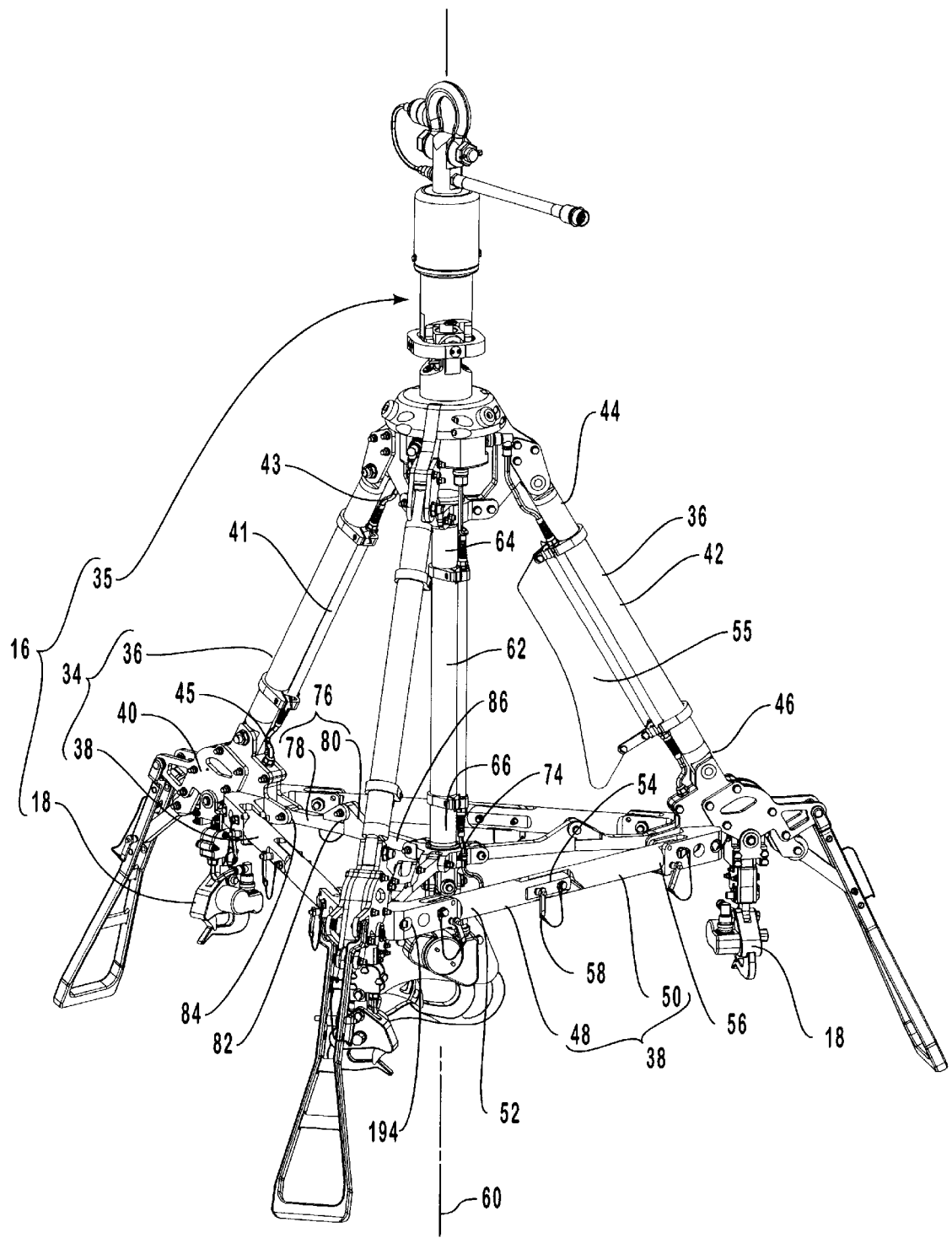
FIG. 2 is a perspective view of the airframe shown in FIG. 1 in an open position.
Figure 3:
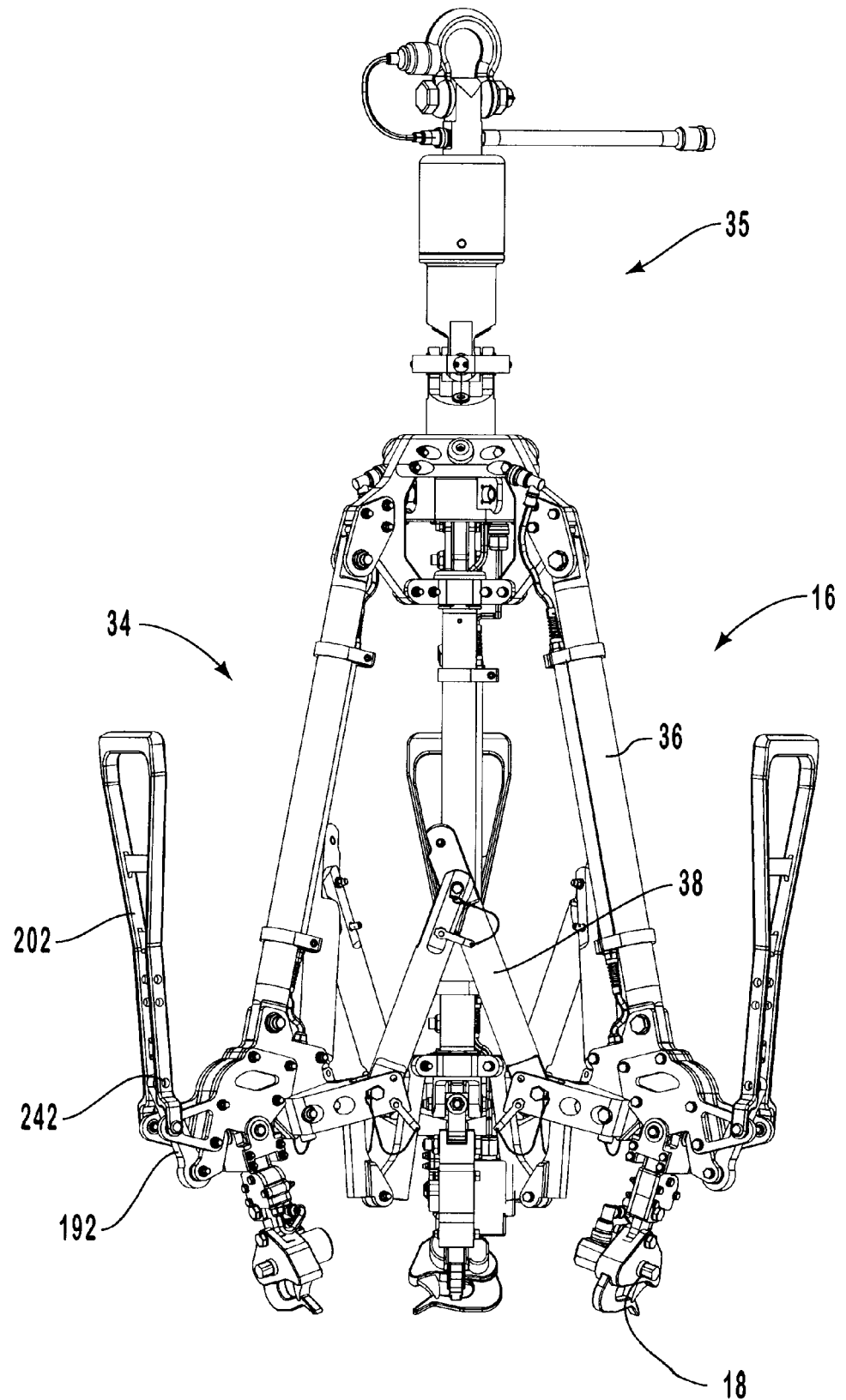
FIG. 3 is a perspective view of the airframe shown in FIG. 2 in a collapsed position.

Airframe 16 is depicted in greater detail in FIGS. 2 and 3. As shown therein, airframe 16 includes a collapsible loading frame 34 to which a hub assembly 35 and payload hooks 18 are attached. Loading frame 34 includes a plurality of vertical struts 36, a plurality of horizontal struts 38, and corner means for hingedly connecting vertical struts 36 and horizontal struts 38. By way of example and not by limitation, the corner means includes a plurality of corner assemblies 40 interconnecting vertical struts 36 and horizontal struts 38. Corner assemblies 40 will be discussed later in greater detail.

Loading frame 34 is configured to have a stabilized open position, as shown in FIG. 2, and a collapsed closed position, as shown in FIG. 3. Preferably, three vertical struts 36 are interconnected with three horizontal struts 38 by corner assemblies 40 to form a generally tetrahedral configuration when airframe 16 is in an open position.

Figure 11:
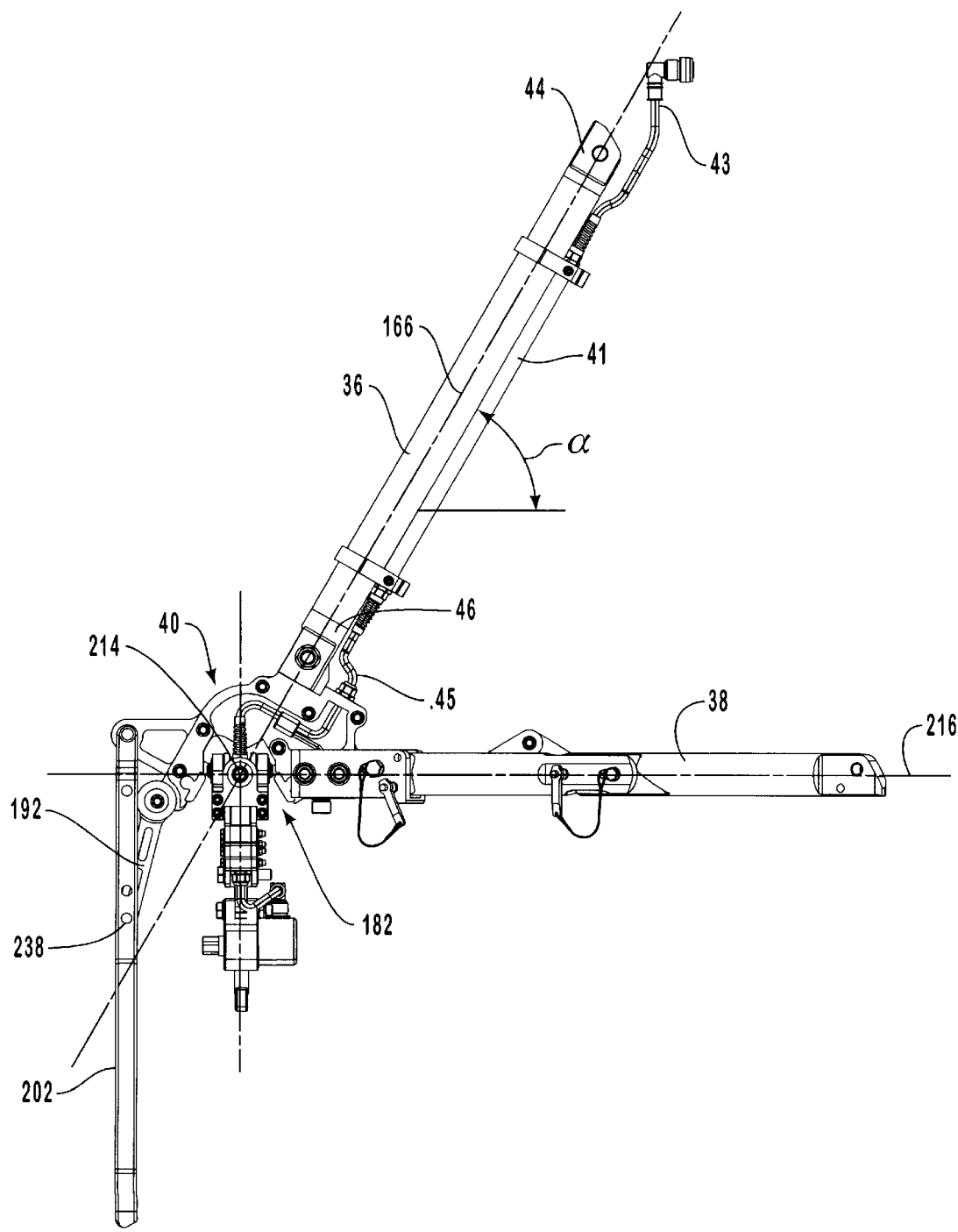
FIG. 11 is an elevated side view of the corner assembly shown in FIG. 9.
Figure 12:
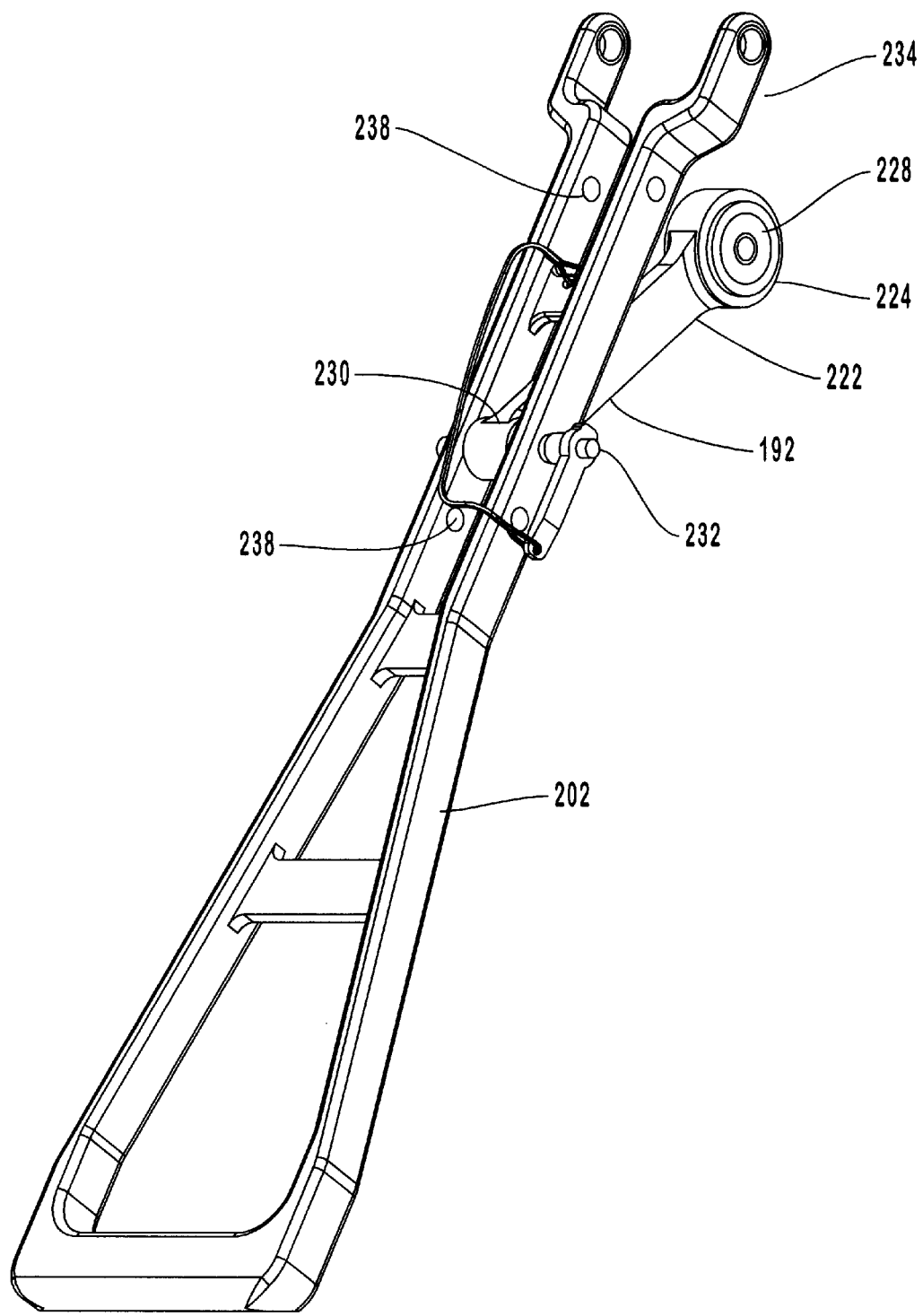
FIG. 12 is a perspective view of a leg assembly of the airframe shown in FIG. 2.

As depicted in FIGS. 2 and 11, each vertical strut 36 comprises a hollow tubular member 42 having a first end 44 hingedly attached to hub assembly 35 and an opposing second end 46 rigidly attachable to a corresponding corner assemblies 40. In an alternative embodiment, second end 46 can be hingedly attachable to corresponding corner assemblies 40. Vertical struts 36 are preferably designed to be interchangeable. In one embodiment, vertical struts 36 are positioned so as to have an inside angle α relative to the horizontal in a range between about 65° to about 45° with about 60° being more preferred. Attached to and running along the side of each vertical strut 36 is an electrical cable section 41. Cable section 41 has a first end 43 configured for electrical coupling with hub assembly 35 and an opposing second end 45 configured for electrical coupling with a corresponding corner assembly 40.

As depicted in FIG. 2, attached to one of the vertical struts 36 is a stabilizing wing 55. Stabilizing wing 55 helps to prevent annular rotation of airframe 16 during flight but is not required. In an alternative embodiment, stabilizing wing 55 can also extend between vertical strut 36 and a center strut 62 discussed below. In yet another embodiment, stabilizing wing 55 can be removed.

Figure 9:
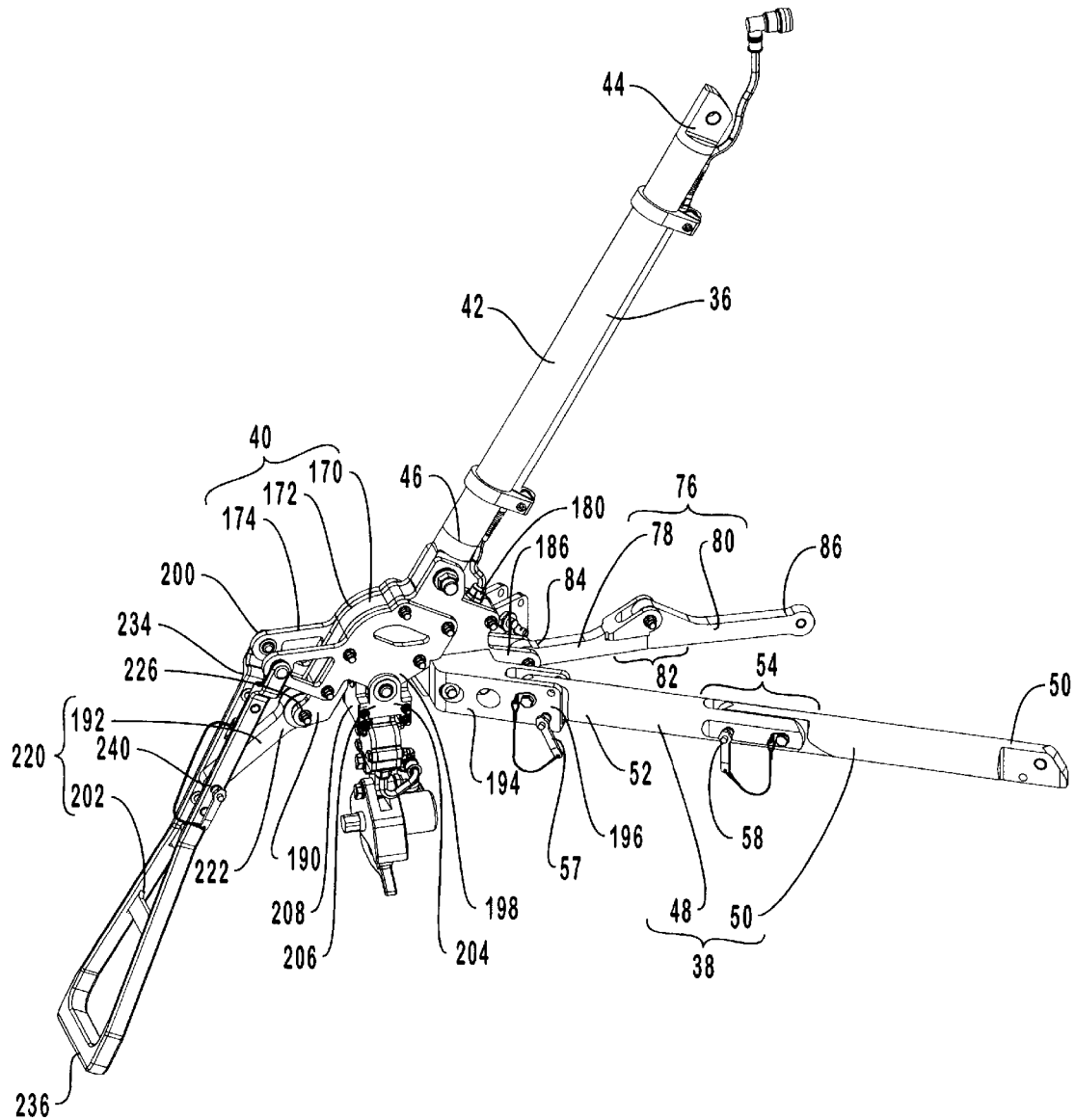
FIG. 9 is a perspective view of the a corner assembly of the airframe shown in FIG.2.

As depicted in FIGS. 2 and 9, each horizontal strut 38 comprises a tubular first member 48 and an adjacent tubular second member 50. Members 48 and 50 are hingedly joined together at a middle portion 54. Each horizontal strut 38 also has a first end 52 and an opposing second end 56. Ends 52 and 56 are hingedly connected to discrete corner assemblies 40 by anchors 194. A removable pin 57 extends through each anchor 194 and horizontal strut 38 to prevent unwanted rotation thereat. A removable pin 58 also secures members 48 and 50 together in linear alignment at middle portion 54. By removing pins 57 and 58, middle portion 54 and ends 52 and 56 are free to hingedly rotate so that, as depicted in FIG. 3, horizontal struts 38 may bend as airframe 16 is collapsed into the closed position. Horizontal struts 38 are also preferably designed to be interchangeable.

In an alternative embodiment, horizontal struts 38 can be formed as a single member without a center hinge. In this embodiment, at least one of the ends 52 or 56 would be removable from the corresponding corner assembly 40 to facilitate collapse of airframe 16.

Figure 4:
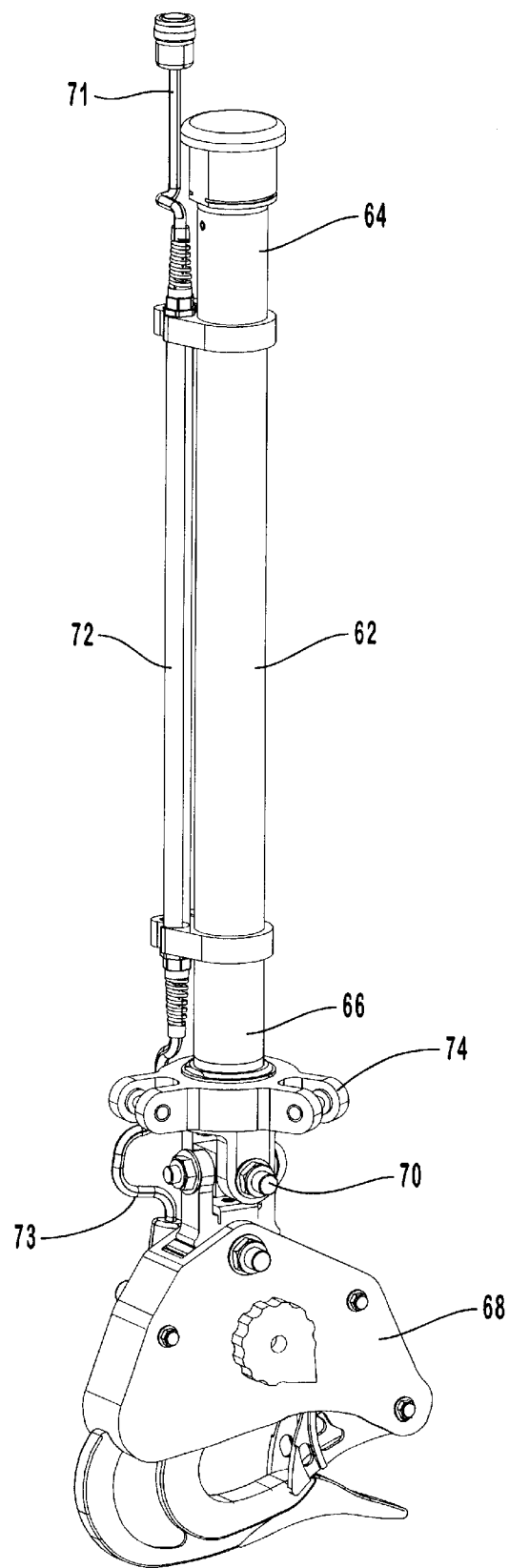
FIG. 4 is a perspective view of a center strut and payload hook from the airframe shown in FIG. 2.

Returning back to FIG. 2, a central axis 60 vertically extends through airframe 16 in the open position. Projecting down from hub assembly 35 along central axis 60 is a tubular center strut 62. As depicted in FIGS. 2 and 4, center strut 62 extends from a first end 64 to an opposing second end 66. First end 64 is secured to hub assembly 35. Second end 66 is coupled with an electronically actuated payload hook 68 by a universal joint 70. Payload hook 68 is used for attaching and selectively releasing a desired payload. Examples of payload hook 68 include the electronically actuated, 3,000 pound to 12,000 pound load capacity hooks available from On Board Systems out of Portland, Oreg. In one embodiment, payload hook 68 has a 9,000 pound load capacity.

An electrical cable section 72 is attached to and extends along the side of center strut 62. Cable section 72 has a first end 71 configured for electrical coupling with hub assembly 35 and an opposing second end 73 configured for electrical coupling with payload hook 68. Cable section 72 assists in carrying electrical signals between helicopter 10 and payload hook 68 for selectively opening payload hook 68. Payload hook 68 automatically closes under a spring bias once the payload is released.

Mounted to second end 66 of center strut 62 above universal joint 70 is a lower mounting hub 74. As depicted in FIGS. 2 and 9, radially extending between lower mounting hub 74 and each corner assembly 40 is a tension member 76. Each tension member 76 includes a first rod member 78 and a second rod member 80 which are hingedly connected together at a central portion 82. Each tension member 76 further includes a first end 84 which is hingedly secured to a corresponding corner assembly 40 and an opposing second end 86 which is hingedly connected to lower mounting hub 74 of center strut 62. In an alternative embodiment, tension member 76 can comprise a cable, cord, or other flexible member.

During use, airframe 16 is configured into the open position as depicted in FIG. 2. In this position, payloads 19 can be secured to payload hooks 18 and 68 for selectively carrying and releasing payloads 19. When it is desired to transport airframe 16, such as within the body of a helicopter or other transport vehicle, corner assemblies 40 are drawn radially inward so as to configure airframe 16 into the folded or collapsed position as depicted in FIG. 3. To fold airframe 16 into the collapsed position, each horizontal strut 38 is folded upward at middle portion 54 and each tension member 76 is folded downward at central portion 82. It is noted that tension member 76 can also be designed to fold upward. As a result, the overall size of airframe 16 is decreased.

In yet another alternative embodiment, it is also envisioned that each tension member 76 can be formed as a single rigid member that does not bend or fold in the middle. In this embodiment, lower mounting hub 74 is configured to slid up and down center strut 62. By sliding up center strut 62, airframe 16 can collapse without bending of tension members 76.

Figure 5:
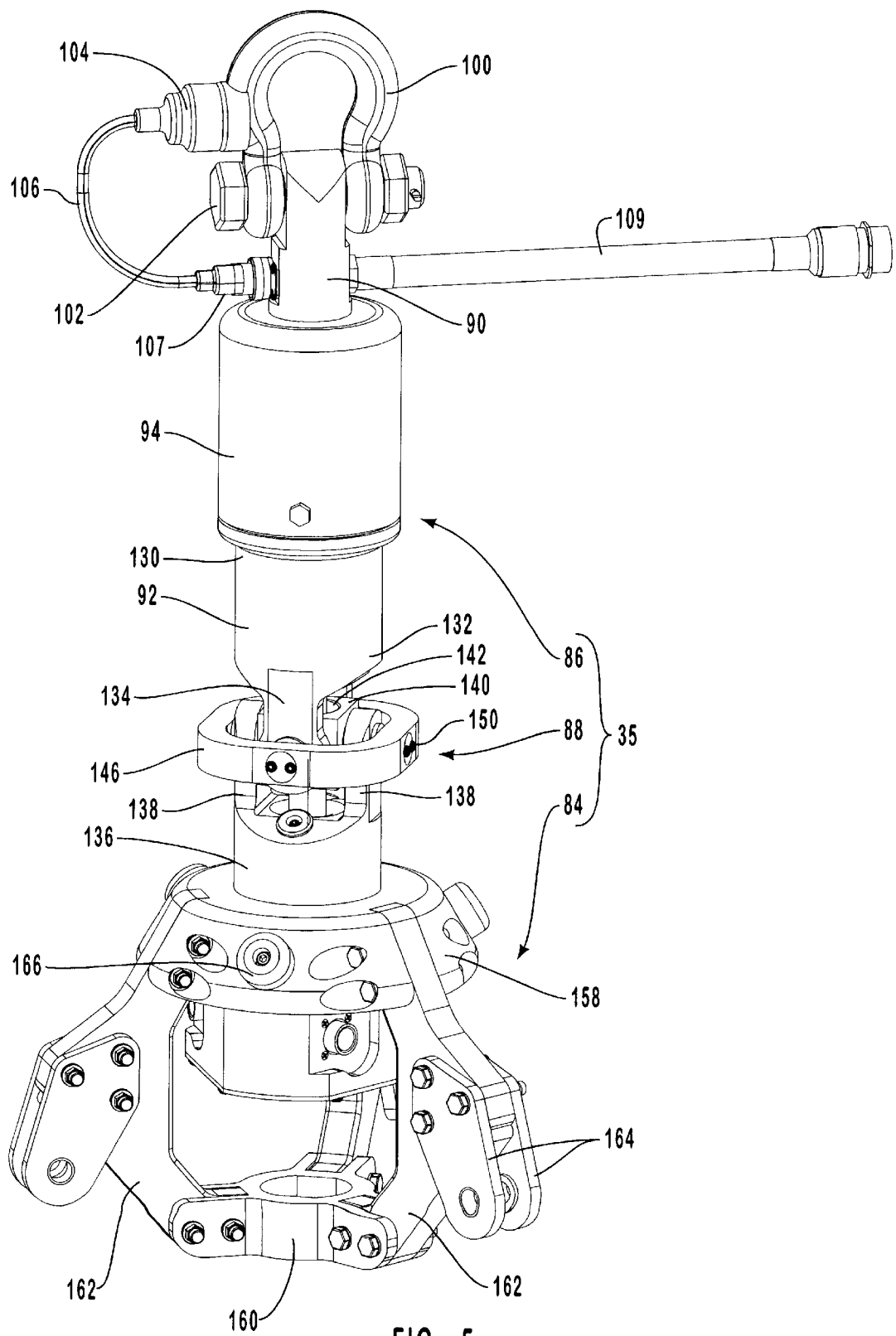
FIG. 5 is a perspective view of a hub assembly from the airframe shown in FIG. 2.

Depicted in FIG. 5 is a perspective view of hub assembly 35. Hub assembly 35 includes a attachment assembly 84 coupled with a spindle assembly 86 by a universal joint 88. Spindle assembly 86 includes a lower housing 92, an upper housing 94 and an elongated spindle 90 partially disposed within both housing 92 and 94. In one embodiment of the present invention, attachment means are provided for securing airframe 16 to support cable 20. By way of example and not by limitation, a U-shaped shackle 100 is secured to spindle 90 by an attachment bolt 102. Shackle 100 receives loop 24 of support cable 20, as depicted in FIG. 1, prior to being attached by bolt 102. In alternative embodiments, shackle 100 can be replaced with a cargo hook, eyelet, or other member that can be attached to cable 20.

As further shown in FIG. 5, mounted to shackle 100 is a load cell 104. Shackle 100 and integrated load cell 104 can be purchased from MUSE Measurement Corp., out of San Dimas, Calif. Extending from load cell 104 is a coupling wire 106. Coupling wire 106 terminates at an electrical plug 107 selectively coupled with spindle 90. Projecting from the side of spindle 90 opposite plug 107 is a relatively stiff electrical cable extender 109. As depicted in FIG. 1, cable extender 109 is selectively coupled with electrical control cable 26. Cable extender 109 function to keep control cable 26 away from airframe 16, thereby helping to prevent damage to control cable 26 during rotation or movement of airframe 16. With control cable 26 attached to cable extender 109, load cell 104 is electrically coupled with helicopter 10. Load cell 104 interacts with a display in helicopter 10 to display the total weight of airframe 16 including the weight of all payloads 19 attached thereto. In an alternative design, discrete load cells can also be coupled with each payload hook 68 to enable selective weighing of each payload 19.

Figure 6:
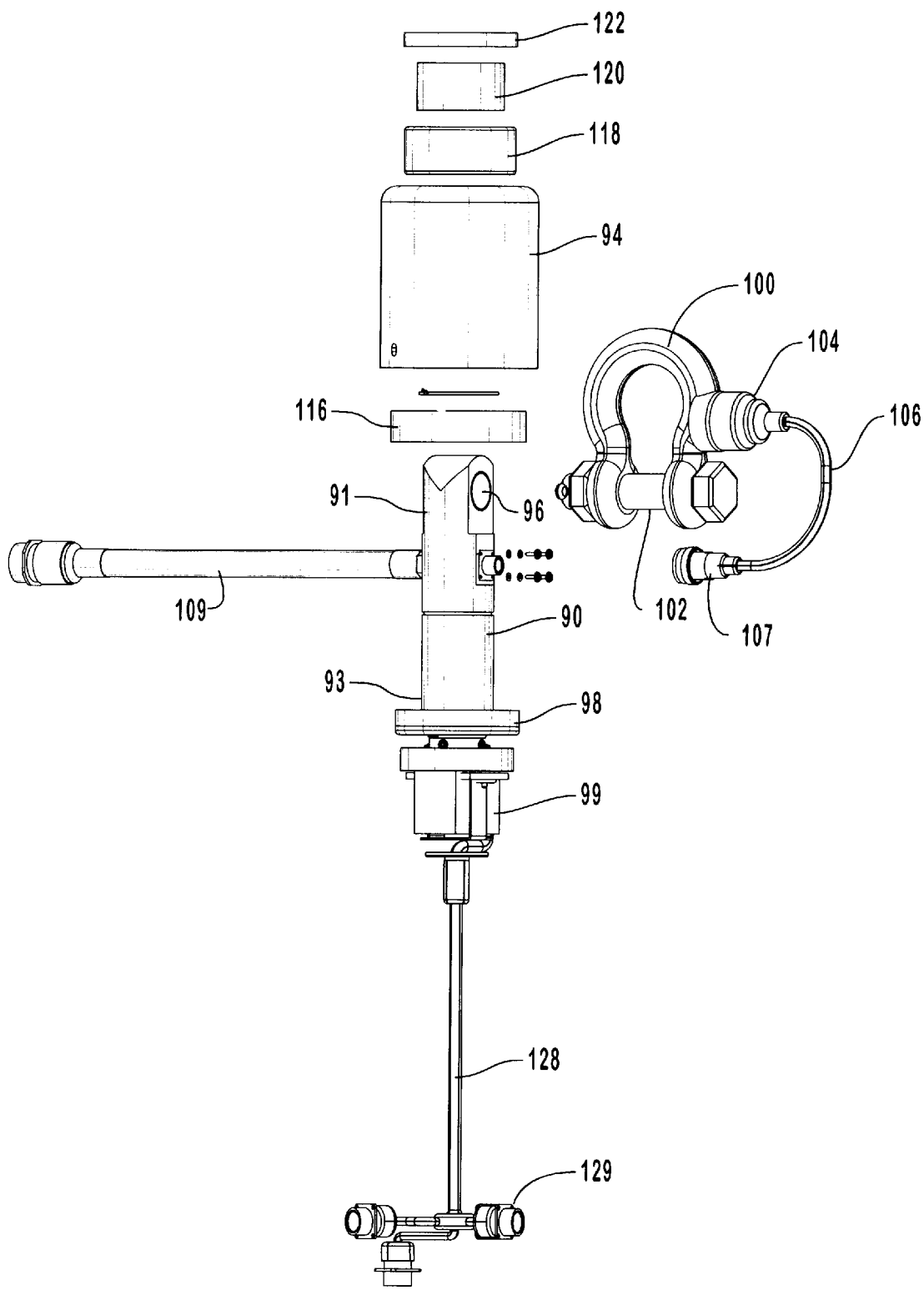
FIG. 6 is a partially disassembled perspective view of a spindle assembly from the hub assembly shown in FIG. 5.
Figure 7:
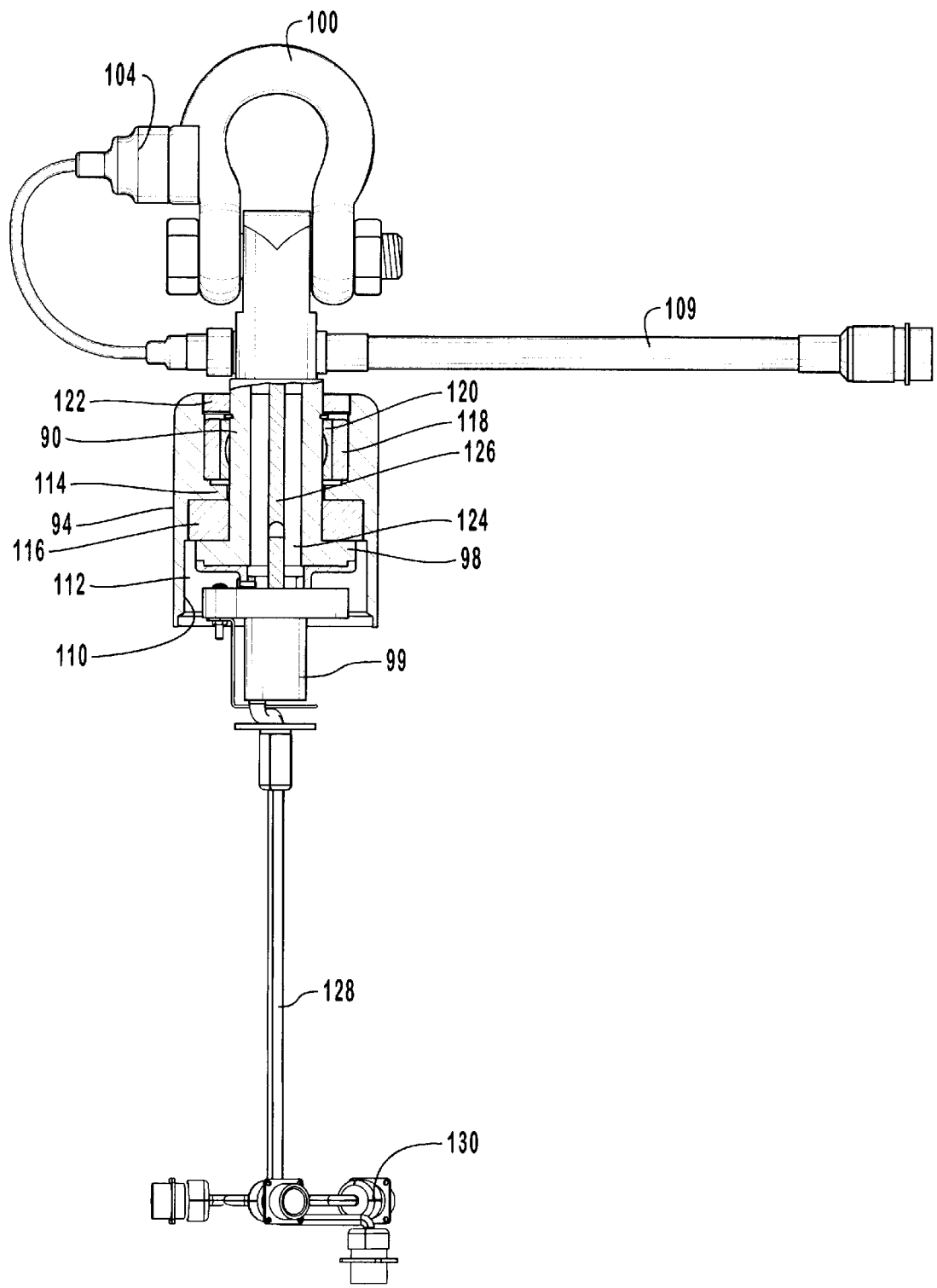
FIG. 7 is a partial cross sectional side view of the spindle assembly shown in FIG. 6 in an assembled condition.

In one embodiment of the present invention, spindle means are disposed between universal joint 88 and the attachment means for enabling annular rotation of loading frame 34 and universal joint 88 relative to the attachment means. By way of example and not by limitation, spindle assembly 86 is provided. As depicted in FIG. 6, spindle 90 of spindle assembly 86 has a top end 91 and an opposing bottom end 93. Top end 91 has an aperture 96 extending therethrough to receive bolt 102. An annular flange 98 radially outwardly projects from bottom end 93. Attached to bottom end 93 below flange 98 is a slip ring 99. As depicted in FIGS. 6 and 7, spindle 90 has an interior channel 124 extending from cable extender 109 through bottom end 93 of spindle 90. Disposed within channel 124 is an electrical first cable section 126. First cable section 126 is electrically coupled with and extends between cable extender 109 and slip ring 99. Extending below slip ring 99 is a second cable section 128 that terminates at a plurality of electrical plugs 130.

Upper housing 94 has an interior surface 110 bounding a chamber 112. Radially inwardly extending from interior surface 110 is an annular flange 114. Disposed between flange 114 of upper housing 94 and flange 98 of spindle 90 is an annular thrust bearing 116. Disposed above flange 114 and encircling spindle 90 is an annular needle bearing 118. Position between needle bearing 118 and spindle 90 is inner ring 120. An annular seal 122 encircles spindle 90 around the top of upper housing 94 so as to prevent material from entering chamber 112.

Figure 8:
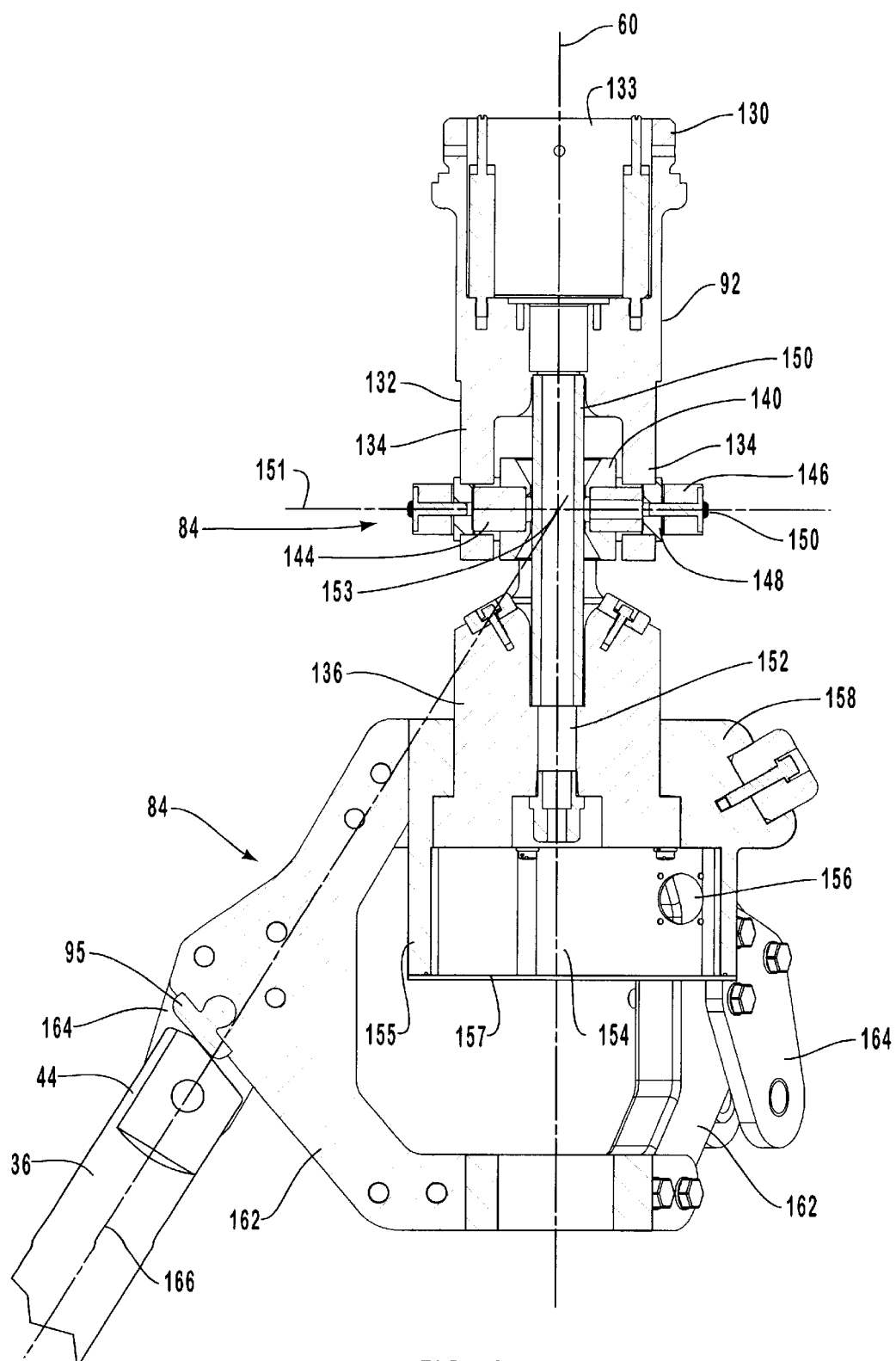
FIG. 8 is a partial cross sectional side view of the hub assembly shown in FIG. 5.

As depicted in FIGS. 5 and 8, lower housing 92 has an upper end 130 and an opposing lower end 132. Recessed within upper end 130 is a chamber 134. Upper end 130 of lower housing 92 is configured to attach with upper housing 94, such as by threaded engagement, so that slip ring 99 is received within chamber 134. In the assembled configuration, upper housing 94 and lower housing 92 freely rotate relative to spindle 90 by riding on bearings 116 and 118. As such, loading frame 34 can also freely rotate relative to spindle 90. The free rotation of loading frame 34 facilitates easy movement and loading of loading frame 34. The free rotation also minimizes stress of loading frame 34, since loading frame 34 is free to automatically rotate to its lowest stress configuration.

The positioning of spindle assembly 86 between universal joint 88 and shackle 100 serves a distinct advantage. That is, by placing spindle assembly 86 above universal joint 88, spindle assembly 86 maintains a substantially vertical alignment during flight while allowing loading frame 34 to freely rotate thereabout. As such, even when single or asymmetrical load is secured to airframe 16, loading frame 34 is free to automatically rotate to its lowest stress configuration without having to vertically move the attached payloads. Although, spindle assembly 86 can be positioned below universal joint 88, during flight spindle assembly 86 is angled back with loading frame 34. As such, for spindle assembly 86 to rotate, the attached payloads must be vertically moved. Accordingly, this configuration can result in increased stress on airframe 16.

Projecting down from lower end 132 of lower housing 92 are a pair of arms 134. Arms 134 form an integral part of universal joint 88. Attachment assembly 84 includes a substantially cylindrical stem 136 having a pair of arms 138 upwardly projecting therefrom. Arms 138 also form an integral part of universal joint 88. Universal joint 88 further includes a mounting block 140 having a channel 142 longitudinally extending therethrough. Extending through channel 142 between lower housing 92 of spindle assembly 86 and stem 136 of attachment assembly 84 is a tubular protective sleeve 150. Arms 134 and 138 are rotatably attached on opposing sides of mounting block 140 by discrete pins 144. An annular ring 146 encircles mounting block 140 and each of arms 136 and 138. A bushing 148 is disposed between ring 146 and each of arms 138 and 140. Pins 150 acting in conjunction with bushings 148 secure ring 150 to each of arms 134 and 138. In this position, each pair of arms 134 and 138 freely rotate around corresponding horizontal axes which are offset in the horizontal plane by 90°. Each of the horizontal axes 151 intersect with each other and with central axes 60 at a central point 153.

The term "universal joint" as used in the attached claims is broadly intended to includes all coupling structures which permit free pivoting rotation of 360° in a horizontal plane. One example of such a "universal joint" is universal joint 88. An alternative universal joint is a ball and socket configuration.

Stem 136 of attachment assembly 84 has a channel 152 longitudinally extending therethrough in communication with sleeve 150. Channel 152 feeds into a compartment 154 bounded by an annular sidewall 155. A plurality of apertures 156 extend through sidewall 155. A removable plate 157 permits access to compartment 154. Attached to and radially outwardly projecting from the side of stem 136 is an annular hub bracket 158. Projecting from the outside surface of hub bracket 158 are a plurality of bumpers 166. Bumpers 166 act as cushions when airframe 16 is in the collapsed position and laid upon its side.

Vertically disposed below hub bracket 158 and compartment housing 154 is an upper mounting bracket 160. Upper mounting bracket 160 has a configuration comparable to lower mounting bracket 74 previously discussed with regard to FIG. 4. Upper mounting bracket 160 is configured for attachment with first end 64 of center strut 62. Extending between hub bracket 158 and upper bracket 160 are a plurality of substantially C-shaped arms 162. Attached to and projecting from a middle portion of each arm 162 are a pair of attachment plates 164. Each pair of attachment plates 164 are configured to hingedly attached to first end 44 of a corresponding vertical strut 36. A bumper 95 is positioned between each arm 162 and vertical strut 36.

One of the unique aspects of the present invention is that airframe 16 is specifically designed to eliminate stress, and particularly moment arms, when payloads 19 are attached thereto. For example, as depicted in FIG. 8, each vertical strut 36 has a central longitudinal axis 166 extending therethrough. Each longitudinal axis 166 intersects with central point 153 of universal joint 88. Accordingly, as payloads 19 are loaded on airframe 16, airframe 16 can freely rotate at universal joint 88 without applying a moment arm on airframe 16 or hub assembly 35.

During assembly, slip ring 99, of FIG. 6, is received within chamber 133 of FIG. 8 such that second cable section 128 passes through sleeve 150, channel 152, and into compartment 154. Plugs 129 are then disposed within apertures 156 of sidewall 155. Plugs 129 are electrically coupled with cable sections 41 on vertical struts 36 and cable section 71 on center strut 62. As discussed above, during operation, spindle 90 remains stationary relative to cable assembly 14 while upper housing 94, lower housing 92, and the remainder of airframe 16 freely rotates relative to spindle 90. With regard to electrical communication, slip ring 99 facilitates free axial rotation of second cable section 128 relative to first cable section 126 while retaining electrical communication therebetween. One embodiment of slip ring 99 can be purchased from Fabricast out of South El Monte, Calif.

Figure 10:
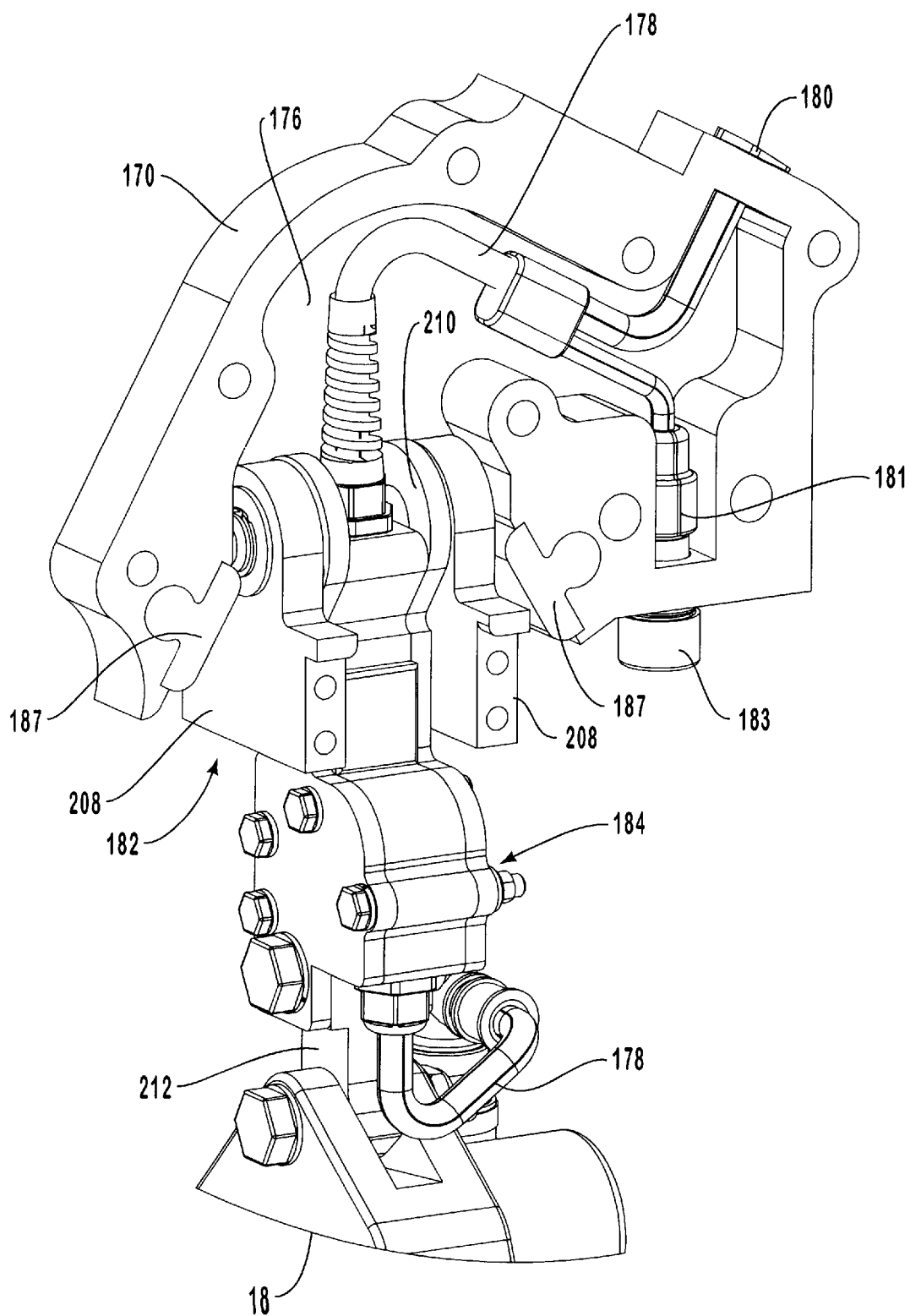
FIG. 10 is a perspective view of a center plate of the corner assembly shown in FIG. 9.

As depicted in FIGS. 9 and 10, each corner assembly 40 includes a center plate 170, a middle plate 172 positioned on each side of center plate 170, and an outside plate 174 positioned on the outside of each middle plate 172. As depicted in FIG. 10, center plate 170 has a cavity 176 extending between the side walls thereof. Disposed within cavity 176 is an electrical cable section 178. Cable section 178 has a first socket 180 configured for electrical coupling with vertical strut cable section 41. Cable section 178 also communicates with a second electrical plug 181. An openly exposed lamp 183 is removably coupled with plug 181. Cable section 178 also extends through a extension housing 184 and subsequently couples with a payload hook 18.

As depicted in FIG. 9, middle plates 172 are mounted in parallel alignment on each side of center plate 170. Each middle plate 172 includes an inside arm 186 to which a corresponding tension member 76 is hingedly attached; a top arm 180 to which second end 46 of a corresponding vertical strut 36 is rigedly or hingedly attached, and an outside arm 190 to which a pivoting arm 192 is hingedly attached. Also mounted to the side of each middle plate 172 is anchor 194. Each anchor 194 has a forked end 196 which is hingedly attached to a corresponding horizontal strut 38.

An outside plate 174 is bolted to each middle plate 172 so as to be in parallel alignment. Each outside plate 174 has a lower attachment arm 198 and an outside attachment arm 200. Hingedly secured to lower attachment arm 198 of each outside plate 174 is universal block 204. Universal block 204 includes a pair of first yoke plates 206 each hingedly attached to lower attachment arm 198 of a corresponding outside plate 174. Universal block 204 also includes a pair of spaced apart second yoke plates 208 secured to and extending between first yoke plates 206. As depicted in FIG. 10, extension housing 184 has a first end 210 and an opposing second end 212. First end 210 of extension housing 184 is hingedly attached to each of second yoke plates 208. As such, the interaction between extension housing 184 and universal block 204 forms a universal joint 182 which allows free angular rotation of payload hook 18. Of course, universal joint 182 can have other "universal joint" configurations as previously discussed. Cushions 187 are mounted on center plate 170 to prevent metal contact with universal joint 182.

As depicted in FIG. 11, universal joint 182 rotates around a load point 214. As previously discussed, one of the unique benefits of the present invention is that airframe 16 has been specifically designed so as to minimize stresses due to moment arms. Accordingly, universal joint 182 is positioned such that a central longitudinal axes 216 extending through each horizontal strut 38 is aligned with and extends through load point 214. Likewise, the central longitudinal axes 166 extending through each vertical struts 36 also intersects with load point 214. Accordingly, even when airframe 16 is tilted under different loading configurations on payload hooks 18, no additional moment arm stresses are placed on loading frame 34.

Electrical cable section 178 couples with each corresponding payload hook 18 to facilitate selective opening and closing of each payload hook 18. Payload hooks 18 are substantially similar to and be purchased from the same company as payload hook 68, previously discussed. In one embodiment, each of payload hooks 18 has a load capacity of about 4,000 pounds.

As depicted in FIG. 9, airframe 16 also includes a plurality of leg assemblies 220. Each leg assembly 220 includes a support leg 202 and means for locking the support leg in a lower and raised position. By way of example and not by limitation, a pivoting arm 192 has a first end 222 hingedly attached to outside arm 190 of each middle plate 172 by an axle 226. As better depicted in FIG. 12, a tubular sleeve 224 is formed at first end 222 of pivoting arm 192. Received within tubular sleeve 224 is a tubular cushion 228. Cushion 228 receives axle 226 therethrough and is preferably made of a resiliently compressible rubber or synthetic material. Cushion 228 acts as a shock absorber as airframe 16 is landed on support legs 202. Pivoting arm 192 also has an opposing second end 230 which is hingedly attached to leg 202 by a removable pin 232.

Leg 202 has a first end 234 that is hingedly attached to outside attachment arm 200 of each outside plate 174. Leg 202 also has an opposing second end 236 configured for resting on a ground surface. Transversely extending through leg 202 are a plurality of pin slots. The pin slots are configured to removable receive pin 232 so that leg 202 can be selectively locked into a desired position by pivoting arm 192. For example, depicted in FIG. 11 each pivoting arm 192 is coupled with a lower pin slot 238 so that legs 202 are in a downwardly projecting vertical position. This leg position is desirable when airframe 16 is being stored or transported, such as in the back of a pickup truck, since it supports payload hooks 18 off of the ground while minimizing the circumferential area which airframe 16 occupies.

Depicted in FIG. 9, each pivoting arm 192 is coupled through a middle pin slot 240 so that legs 220 slope outward. This is the preferred position for legs 220 during conventional use of airframe 16. Finally, depicted in FIG. 3 each pivoting arm 192 is coupled through an upper pin slot 242 when legs 202 are rotated to project almost vertically upward. This is the preferred position when airframe 16 is positioned into its collapsed configuration so as to minimize size.

The above described embodiment is merely one example of the present invention. In an alternative embodiment, the present invention also envisions that the vertical and horizontal struts can be rigidly secured at their opposing ends such that the airframe does not fold into a collapsed position. Nevertheless, the horizontal and vertical struts can still be aligned with corresponding universal joints so as to minimize moment arm stress.

The cargo management system utilizing the airframe apparatus of the present invention can efficiently transport various payloads of supplies to personnel in emergency situations such as fire fighters in remote areas, soldiers during training or wartime operations, etc. The cargo management system maximizes a helicopter's external load capacity by enabling the helicopter to carry multiple loads. This minimizes the number of helicopters needed for logistics missions, and lowers operational costs. In addition, flight time is reduced for logistics operations due to multiple mission capability. The cargo management system is aerodynamically stable including during hover, and is easily maintainable in the field.

The cargo management system is a stand alone system that can be coupled in a few minutes on any vertical lift aircraft capable of carrying external cargo, with no modification required. The cargo management system provides for electronic payload monitoring and control, and enables selective delivery and retrieval of multiple external loads on a single sortie. The system also provides crew members on an aircraft with a constant readout of the cargo's weight and status.

Various safety features of the cargo management system include system redundancy allowing for electronic or manual release of the payload hooks. The need for a ground crew is thus eliminated when delivering multiple loads.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. An apparatus for attaching and releasing multiple payloads suspended from an aircraft by a cable, the apparatus comprising:
   (a) a collapsible loading frame including a plurality of vertical struts each having a top end and a bottom end and a plurality of horizontal struts each having opposing ends, the vertical struts and horizontal struts being interconnected so as to enable selective positioning of the loading frame between a stabilized open position and a collapsed closed position;
   (b) a plurality of payload hooks attached to the loading frame; and
   (c) attachment means for securing the loading frame to the cable.

2. The apparatus of claim 1, wherein the loading frame has a substantially tetrahedral shape when in the open position.

3. The apparatus of claim 1, wherein the loading frame comprises corner means for hingedly connecting the vertical struts and the horizontal struts.

4. The apparatus of claim 1, wherein each horizontal strut has a hinge formed between the opposing ends thereof.

5. The apparatus of claim 1, wherein the attachment means comprises a shackle.

6. The apparatus of claim 1, further comprising a hub assembly disposed between the attachment means and the vertical struts, the hub assembly being configured to facilitate annular rotation of the loading frame relative to the attachment means.

7. The apparatus of claim 1, further comprising a plurality of support legs mounted to the loading frame.

8. The apparatus of claim 1, further comprising a stabilizing wing attached to a vertical strut.

9. An apparatus for attaching and releasing multiple payloads suspended from an aircraft, the apparatus comprising:
   (a) a plurality of spaced apart corner assemblies;
   (b) a plurality of elongated horizontal struts extending between the corner assemblies, the elongated struts forming a polygonal configuration disposed in a first plane and having a central axis transversely extending though the first plane;
   (c) a hub disposed above the horizontal struts in alignment with the central axis;
   (d) a plurality of vertical struts, each vertical strut extending at an angle from a select corner assembly to the hub;
   (e) a center strut projecting from the hub along the central axis;
   (f) a plurality of tension members, each tension member extending from a select corner assembly to the center strut; and
   (g) a plurality of cargo hooks, each cargo hook being attached to a corresponding corner assembly.

10. The apparatus of claim 9, wherein each of the plurality of tension members has a folding hinge formed between the opposing ends thereof.

11. The apparatus of claim 9, wherein each of the plurality of horizontal struts has a folding hinge formed between the opposing ends thereof.

12. The apparatus of claim 9, further comprising a cargo hook attached to the center strut adjacent to the plurality of tension members.

13. The apparatus of claim 9, wherein each vertical strut is hingedly attached to the hub and a corresponding corner assembly.

14. The apparatus of claim 9, wherein each horizontal strut is hingedly attached at each opposing end to a corresponding corner assembly.

15. An apparatus for attaching and releasing multiple payloads suspended from an aircraft by a cable, the apparatus comprising:
   (a) a loading frame;
   (b) a plurality of payload hooks attached to the loading frame;
   (c) a plurality of support legs each have a first end and an opposing second end, the first end of each support leg being hingedly attached to the loading frame such that each support leg can be manually rotated between a lowered position wherein the second end of each support leg is positioned below the payload hooks so as to support the loading frame and payload hooks off a ground surface and a raised position wherein the second end of each support leg is positioned above the payload hooks; and (d) means for locking the support legs in the lowered and raised position.

16. An apparatus of claim 15, wherein the means for locking comprises a pivot arm associated with each support leg, each pivot arm having a first end hingedly attached to the loading frame and an opposing second end configured for removable attachment to defined points on a corresponding leg between the opposing ends thereof.

17. An apparatus of claim 16, wherein each pivot arm has a tubular sleeve formed at the first end thereof and a cushion positioned within the tubular sleeve.

18. An apparatus for attaching and releasing multiple payloads suspended from an aircraft by a cable, the apparatus comprising:

(a) a loading frame;

(b) a plurality of payload hooks attached to the loading frame;

(c) attachment means for securing the loading frame to the cable;

(d) a universal joint disposed between the loading frame and the attachment means; and (e) spindle means disposed between the universal joint and the attachment means for enabling annular rotation of the loading frame and universal joint relative to the attachment means.

19. An apparatus for attaching and releasing multiple payloads suspended from an aircraft by a cable, the apparatus comprising:

(a) a loading frame including a plurality of vertical struts each having a central longitudinal axis, the vertical struts being positioned such that the central longitudinal axis of each vertical strut intersects at a central point;

(b) a plurality of payload hooks attached to the loading frame;

(c) attachment means for securing the loading frame to the cable; and (d) a universal joint disposed between the loading frame and the attachment means, the universal joint being aligned with the central point defined by the intersecting longitudinal axis of the vertical struts such that the universal joint bends at the central point.

20. An apparatus of claim 19, further comprising spindle means disposed between the universal joint and the attachment means for enabling annular rotation of the loading frame and universal joint relative to the attachment means.

21. The apparatus of claim 20, wherein the attachment means comprises a shackle having a load cell coupled therewith.

22. The apparatus of claim 20, wherein the universal joint has an electrical cable extending through the center thereof.

23. An apparatus for attaching and releasing multiple payloads suspended from an aircraft, the apparatus comprising:

a loading frame including a plurality of spaced apart corner assemblies and a plurality of elongated horizontal struts extending between the corner assemblies, each elongated strut having a central longitudinal axis, the horizontal struts being configured such that the central longitudinal axis of adjacent horizontal struts intersect at a load point;

a plurality of payload hooks;

attachment means for securing the loading frame to a cable; and a universal joint connecting each payload hook to a corresponding corner assembly, each universal joint being aligned with a corresponding load point defined by the intersecting longitudinal axis of vertical struts such that the universal joints bend at the corresponding load points.

24. An apparatus of claim 23, wherein the loading frame further includes a plurality of vertical struts each having a central longitudinal axis, the longitudinal axis of each vertical strut intersecting with a load point at a corresponding corner assembly.

25. An apparatus of claim 23, further comprising a plurality of support legs projecting from the loading frame.

26. An apparatus for attaching and releasing multiple payloads suspended from an aircraft, the apparatus comprising:

a loading frame including a plurality of spaced apart corner assemblies and a plurality of elongated horizontal struts extending between the corner assemblies, each elongated strut having a central longitudinal axis, the horizontal struts being configured such that the central longitudinal axis of adjacent horizontal struts intersect at a load point;

a plurality of payload hooks;

attachment means for securing the loading frame to a cable;

a universal joint connecting each payload hook to a corresponding corner assembly, each universal joint being, aligned with a corresponding load point defined by the intersecting longitudinal axis of vertical struts such that the universal joints bend at the corresponding load points;

a plurality of vertical struts each extending from a corresponding corner assembly to a common hub, each vertical strut having a central longitudinal axis, the vertical struts being positioned such that the central longitudinal axis of each vertical strut intersects at a central point; and a universal joint disposed between the hub and the attachment means, the universal joint being aligned with the central point defined by the intersecting longitudinal axis of the vertical struts such that the universal joint bends at the central point.

27. An apparatus of claim 26, further comprising spindle means disposed between the universal joint and the attachment means for enabling annular rotation of the loading frame and universal joint relative to the attachment means.

* * * * *